(12) United States Patent
De

(10) Patent No.: US 10,373,092 B2
(45) Date of Patent: Aug. 6, 2019

(54) SYSTEM AND METHOD FOR PROVIDING A TRADEOFF BETWEEN TIME AND QUALITY FOR A TASK

(71) Applicant: ORACLE INTERNATIONAL CORPORATION, Redwood Shores, CA (US)

(72) Inventor: Niladri Sekhar De, Hyderabad (IN)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 915 days.

(21) Appl. No.: 14/847,581

(22) Filed: Sep. 8, 2015

(65) Prior Publication Data

US 2017/0068916 A1    Mar. 9, 2017

(51) Int. Cl.
| | |
|---|---|
| *G06Q 10/00* | (2012.01) |
| *G06Q 10/06* | (2012.01) |
| *G06F 17/28* | (2006.01) |
| *G06N 20/20* | (2019.01) |
| *G06F 9/445* | (2018.01) |
| *G06Q 10/10* | (2012.01) |

(52) U.S. Cl.
CPC ..... *G06Q 10/0639* (2013.01); *G06F 9/44505* (2013.01); *G06F 17/289* (2013.01); *G06N 20/20* (2019.01); *G06Q 10/06313* (2013.01); *G06Q 10/063118* (2013.01); *G06Q 10/10* (2013.01)

(58) Field of Classification Search
None
See application file for complete search history.

(56) References Cited

U.S. PATENT DOCUMENTS

| | | | |
|---|---|---|---|
| 6,173,029 B1 * | 1/2001 | Xie | G06T 11/005 378/4 |
| 7,110,956 B1 * | 9/2006 | Drake, Jr. | G05B 19/41865 705/35 |

(Continued)

OTHER PUBLICATIONS

Liberatore, et al., Improving Project Management Decision Making by Modeling Quality, Time, and Cost Continuously, pp. 1-17; downloaded Sep. 8, 2015 from: http://www.nedsi.org/proc/2012/proc/p111030001.pdf.

Ghodsi, et al., A New Practical Model to Trade-off Time, Cost, and Quality of a Project, Australian Journal of Basic and Applied Sciences, 3(4): 3741-3756, 2009; ISN 1991-8178, pp. 1-16; downloaded on Sep. 8, 2015 from https://www.academia.edu/8061280/A_New_Practical_Model_to_Trade-off_Time_Cost_and_Quality_of_a_Project.

(Continued)

*Primary Examiner* — Gurkanwaljit Singh
(74) *Attorney, Agent, or Firm* — Kraguljac Law Group, LLC

(57) ABSTRACT

Systems, methods, and other embodiments are disclosed that are configured to make tradeoffs between time and quality for tasks of a project in a computerized project plan. In one embodiment, at task of a project is represented as a task data structure in a computerized project plan. A time duration in which to complete the task may be automatically transformed in the task data structure by manually changing a quality level of a result of the task in the task data structure in response to user interaction with a graphical user interface of the computerized project plan. Similarly, the quality level of the result of the task may be automatically transformed in the task data structure by manually changing the time duration in which to complete the task in the task data structure in response to user interaction with the graphical user interface of the computerized project plan.

18 Claims, 11 Drawing Sheets

(56) References Cited

U.S. PATENT DOCUMENTS

| | | | | |
|---|---|---|---|---|
| 8,585,599 | B2* | 11/2013 | Nakahira | G01S 7/52026 382/128 |
| 2002/0099578 | A1* | 7/2002 | Eicher, Jr. | G06Q 10/06 705/7.39 |
| 2002/0099580 | A1* | 7/2002 | Eicher, Jr. | G06Q 10/06 705/26.25 |
| 2004/0073547 | A1 | 4/2004 | Hamilton | |
| 2009/0175548 | A1* | 7/2009 | Fukuhara | H04N 19/63 382/233 |
| 2010/0185547 | A1 | 7/2010 | Scholar | |
| 2010/0280378 | A1* | 11/2010 | Nakahira | G01S 7/52026 600/445 |
| 2012/0099743 | A1* | 4/2012 | Ozaki | H03F 1/0205 381/120 |
| 2013/0163836 | A1* | 6/2013 | Pau | G06T 7/00 382/128 |
| 2015/0358810 | A1* | 12/2015 | Chao | H04W 52/0209 455/418 |
| 2015/0379427 | A1* | 12/2015 | Dirac | G06N 99/005 706/12 |
| 2015/0379429 | A1* | 12/2015 | Lee | G06N 99/005 706/11 |
| 2016/0162478 | A1* | 6/2016 | Blassin | G06Q 10/06311 706/12 |

OTHER PUBLICATIONS

Khang et al., Time, Cost and Quality Trade-Off in Project Management: A Case Study, International Journal of Project Management vol. 17, No. 4, pp. 249-256, 1999; downloaded from: http://ocw.unican.es/ensenanzas-technicas/organizacion-y-gestion-del-proyecto/otrosrecursos-2/CASE%20STUDY.pdf.

Hu et al., An Innovative Time-Cost-Quality Tradeoff Modeling of Building Construction Project Based on Resource Allocation, Hindawi Publishing Corp., The Scientific World Journal, vol. 2014, Article ID 673248, pp. 1-11.; downloaded from downloads.hindawi.com/journals/tswj/2014/673248.pdf.

Blok et al., Predicting the Cost-Quality Trade-Off for Information Retrieval Queries: Facilitating Database Design and Query Optimization, pp. 1-8, downloaded on Sep. 8, 2015 from: http://wwwhome.ewi.utwente.nl/~hiemstra/papers/cikm01.pdf.

Kim et al., A Practical Approach to Project Scheduling: Considering the Potential Quality Loss Cost in the Time-Cost Tradeoff Problem, Science Direct—International Journal of Project Management 30 (2012) pp. 264-272, downloaded from http://web.nchu.edu.tw/pweb/users/arborfish/lesson/10494.pdf.

* cited by examiner

Exponential Case:

| k (=T0/T1) | 0.2 | 0.3 | 0.4 |
|---|---|---|---|
| q = me^t + p | | | |
| m (=1/(e-e^k)) | 0.668 | 0.731 | 0.815 |
| p (=-me^k) | -0.816 | -0.986 | -1.216 |
| Input t, output q (=me^t+p) | | | |
| t = (T/T1) | q | q | q |
| 0.5 | 0.285 | 0.218 | 0.128 |
| 0.6 | 0.401 | 0.345 | 0.269 |
| 0.7 | 0.529 | 0.485 | 0.426 |
| 0.8 | 0.671 | 0.640 | 0.598 |
| 0.9 | 0.827 | 0.811 | 0.789 |
| Input q, output t (=ln((q-p)/m)) | | | |
| q | t | t | t |
| 0.5 | 0.678 | 0.710 | 0.744 |
| 0.6 | 0.751 | 0.775 | 0.801 |
| 0.7 | 0.819 | 0.836 | 0.855 |
| 0.8 | 0.883 | 0.894 | 0.905 |
| 0.9 | 0.943 | 0.948 | 0.954 |

FIG. 4

Quadratic Case:

| k (=T0/T1) | 0.2 | 0.3 | 0.4 |
|---|---|---|---|
| q = mt^2 + p | | | |
| m (=1/(1-k^2)) | 1.042 | 1.099 | 1.190 |
| p (=-k^2/(1-k^2)) | -0.042 | -0.099 | -0.190 |
| Input t, output q (=mt^2+p) | | | |
| t = (T/T1) | q | q | q |
| 0.5 | 0.219 | 0.176 | 0.107 |
| 0.6 | 0.333 | 0.297 | 0.238 |
| 0.7 | 0.469 | 0.440 | 0.393 |
| 0.8 | 0.625 | 0.604 | 0.571 |
| 0.9 | 0.802 | 0.791 | 0.774 |
| Input q, output t (=((q-p)/m)^0.5) | | | |
| q | t | t | t |
| 0.5 | 0.721 | 0.738 | 0.762 |
| 0.6 | 0.785 | 0.797 | 0.815 |
| 0.7 | 0.844 | 0.853 | 0.865 |
| 0.8 | 0.899 | 0.904 | 0.912 |
| 0.9 | 0.951 | 0.953 | 0.957 |

FIG. 5

Cubic Case:

| k (=T0/T1) | 0.2 | 0.3 | 0.4 |
|---|---|---|---|
| q = mt^3 + p | | | |
| m (=1/(1-k^3)) | 1.008 | 1.028 | 1.068 |
| p (=-k^3/(1-k^3)) | -0.008 | -0.028 | -0.068 |
| Input t, output q (=mt^3+p) | | | |
| t = (T/T1) | q | q | q |
| 0.5 | 0.118 | 0.101 | 0.065 |
| 0.6 | 0.210 | 0.194 | 0.162 |
| 0.7 | 0.338 | 0.325 | 0.298 |
| 0.8 | 0.508 | 0.498 | 0.479 |
| 0.9 | 0.727 | 0.721 | 0.710 |
| Input q, output t (=((q-p)/m)^(1/3)) | | | |
| q | t | t | t |
| 0.5 | 0.796 | 0.801 | 0.810 |
| 0.6 | 0.845 | 0.848 | 0.855 |
| 0.7 | 0.889 | 0.891 | 0.896 |
| 0.8 | 0.929 | 0.930 | 0.933 |
| 0.9 | 0.966 | 0.966 | 0.968 |

FIG. 6

SYSTEM AND METHOD FOR PROVIDING A TRADEOFF BETWEEN TIME AND QUALITY FOR A TASK

BACKGROUND

In the field of project planning, a project manager can establish a project plan for a project by defining tasks and groups of tasks. A task can have a beginning time, and ending time, and a time duration between the beginning time and the ending time over which the task is to be completed. Furthermore, the project manager can set up or define dependencies between tasks within the project plan. For various reasons, often a situation may arise where a task is to be rushed or completed in a hurry, ahead of its originally established due time. This happens across many businesses and industries. However, moving up a completion date of a task may result in a reduced quality for the result of the task.

For example, if the task is to paint a building, the quality of the resultant paint job may suffer if the task, which is normally scheduled to be accomplished over a period of five days, is altered to be completed in just three days. However, the degradation in quality may be unknown. Similarly, if a quality criterion is relaxed by a certain amount, the amount of time saved in completing the task to the new, lower quality standard may be unknown. Today, trying to relate quality to time involves gathering a large number of data points for every type of task for every type of industry or technology. Often, however, such data points are not available.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments one element may be designed as multiple elements or that multiple elements may be designed as one element. In some embodiments, an element shown as an internal component of another element may be implemented as an external component and vice versa. Furthermore, elements may not be drawn to scale.

FIG. 4 illustrates a first table of data and formulas used to form the exponential tradeoff relationship shown in FIG. 3;

FIG. 5 illustrates a second table of data and formulas used to form the quadratic tradeoff relationship shown in FIG. 3;

FIG. 6 illustrates a third table of data and formulas used to form the cubic tradeoff relationship shown in FIG. 3;

DETAILED DESCRIPTION

In the field of project planning, a project plan may be electronically implemented in a computerized project planning application. A project manager can define tasks associated with a project within the electronic project plan with respect to various times (e.g., dates). Task data structures are generated, within a computerized project plan, which represent actual tasks of a project to be performed in the real world.

Systems, methods, and other embodiments are disclosed for establishing tradeoff relationships between a time variable and a quality variable, associated with task data structures representing tasks of a project within a computerized project plan. Furthermore, systems, methods, and other embodiments are disclosed for manipulating the task data structures to make tradeoffs between time and quality for the tasks based on the established tradeoff relationships.

The following terms are used herein with respect to various embodiments.

The terms "quality" and "quality level" may be used interchangeably herein when referring to the result of a task.

The terms "time" and "time duration" may be used interchangeably herein when referring to a span of time to complete a task.

The term "task data structure", as used herein, refers to a data structure defined within a computerized project plan which represents a task to be completed for a project, for example, in the real world.

The term "relational model, as used herein, refers to, for example, a formula, an equation, or a table of data in a data structure, for example, that relates a time variable to a quality variable.

Figure 1:
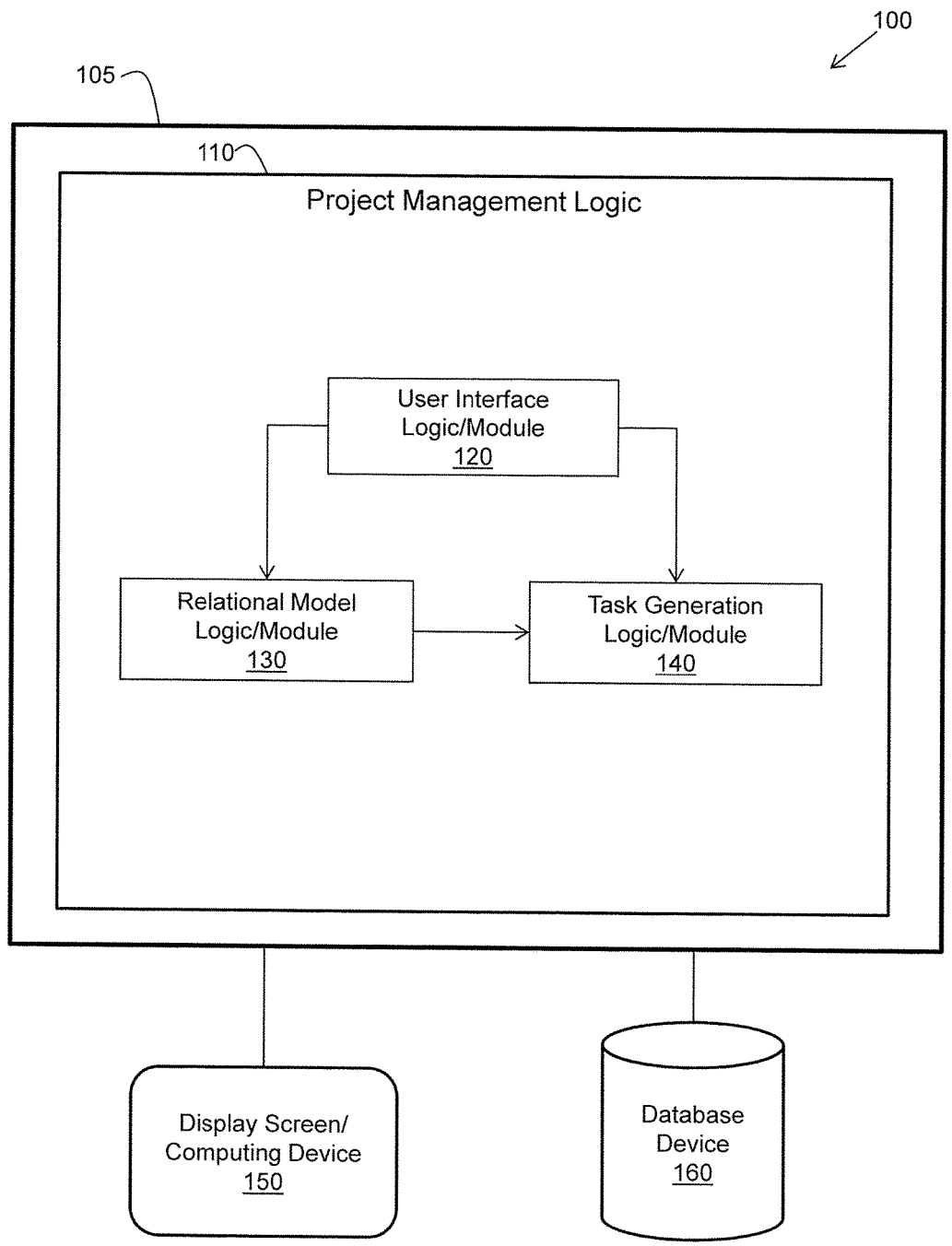
FIG. 1 illustrates one embodiment of a computer system, having a computing device configured with a project management logic.

FIG. 1 illustrates one embodiment of a computer system 100, having a computing device 105 configured with project management logic 110. The project management logic 110 is configured to computerize the process of establishing a tradeoff relationship between a time variable and a quality variable associated with a task data structure representing a task of a project within a computerized project plan. Furthermore, the project management logic 110 is configured to computerize the process of manipulating the task data structure to make tradeoffs between time and quality for the task based on the established tradeoff relationship.

For example, in one embodiment, to establish a tradeoff relationship for a task, a first data point may be established within a data field of a task data structure representing the task. The first data point is established by pairing an estimated time duration in which to complete the task with a maximum quality level for a result of a task. Similarly, a second data point is established within a data field of the task data structure by pairing another estimated time duration in which to complete the task with a minimum quality level for the result of the task. A relational model (e.g., an exponential model, a quadratic model, or a cubic model) is applied between the first data point and the second data point within data fields of the task data structure to complete the tradeoff relationship. The relational model relates a time variable to a quality variable associated with the task.

Furthermore, in one embodiment, once the tradeoff relationship is established for a task, a user may manipulate the task data structure. The task data structure may be manipulated to tradeoff a quality of a result of the task with a time duration to complete the task based on the tradeoff relationship between the first and second data points. Manipulation of the task data structure may be accomplished via a graphical user interface of the computerized project plan. In one embodiment, a task bar of the task may be displayed with a quality icon and a time icon.

As an example, the quality icon may be moved by a user along a quality dimension or scale of the task bar, resulting in the time icon automatically moving along a time dimension or scale of the task bar in accordance with the established tradeoff relationship. Similarly, the time icon may be moved by a user along the time dimension or scale of the task bar, resulting in the quality icon automatically moving along the quality dimension or scale of the task bar in accordance with the established tradeoff relationship. Therefore, a user can view, for example, a resultant reduction in time to complete a task based on an acceptable reduction in quality of the result of the task, and vice versa.

In one embodiment, the system 100 is a computing/data processing system including an application or collection of distributed applications for enterprise organizations. The applications and computing system 100 may be configured to operate with or be implemented as a cloud-based networking system, a software-as-a-service (SaaS) architecture, or other type of computing solution.

The embodiments described herein allow the relating of quality vs. time for tasks of a project in a computerized manner. User interface logic provides a graphical user interface with which a user (e.g., a project manager) may interact to establish and manipulate task data structures within a computerized project plan to make tradeoffs between quality and time.

In one embodiment, a computer algorithm is disclosed that implements a computerized approach to establishing and manipulating tradeoff relationships for tasks represented within a computerized project plan. It is assumed herein that the task data structures represent real tasks of a real project that is being executed (or is about to be executed) in the real world.

With reference to FIG. 1, in one embodiment, the project management logic 110 is implemented on the computing device 105 and includes logics for implementing various functional aspects of the project management logic 110. In one embodiment, the project management logic 110 includes user interface logic 120 (e.g., a user interface module), relational model logic 130 (e.g., a relational model module), and task generation logic 140 (e.g., a task generation module).

The computer system 100 also includes a display screen 150 operably connected via an operable connection to the computing device 105. In accordance with one embodiment, the display screen 150 is implemented to display views of and facilitate user interaction with a graphical user interface (GUI) (e.g., for viewing and updating information associated with generating task data structures within a computerized project plan and establishing quality/time tradeoff relationships for the task data structures). The graphical user interface may be associated with a program management application and the user interface logic 120 may be configured to generate the graphical user interface, in accordance with one embodiment.

In one embodiment, the computer system 100 is a centralized server-side application that provides at least the functions disclosed herein and that is accessed by many users via computing devices/terminals communicating with the computer system 100 (functioning as the server) over a computer network. Thus the display screen 150 may represent multiple computing devices/terminals that allow users to access and receive services from the project management logic 110 via networked computer communications.

In one embodiment, the computer system 100 further includes at least one database device 160 operably connected to the computing device 105 and/or a network interface to access the database device 160 via an operable connection. For example, in one embodiment, the database device 160 is operably connected via a network connection to the user interface logic 120. In accordance with one embodiment, the database device 160 is configured to store and manage data structures (e.g., files or records associated with computerized project plans) associated with the project management logic 110 in a database system (e.g., a program management system).

Other embodiments may provide different logics or combinations of logics that provide the same or similar functionality as the project management logic 110 of FIG. 1. In one embodiment, the project management logic 110 is an executable application including algorithms and/or program modules configured to perform the functions of the logics. The application is stored in a non-transitory computer storage medium. That is, in one embodiment, the logics of the project management logic 110 are implemented as modules of computer-executable instructions stored on a computer-readable medium.

Referring back to the logics of the project management logic 110 of FIG. 1, in one embodiment, the user interface logic 120 is configured to generate a graphical user interface (GUI) to facilitate user interaction with the project management logic 110. For example, the user interface logic 120 includes program code that generates and causes the graphical user interface to be displayed based on an implemented graphical design of the interface. In response to user actions and selections via the GUI, associated aspects of manipulating an electronic project plan may be performed. For example, a user may employ the GUI to generate task data structures representing real-world tasks, and relate the task structures to each other in a temporally dependent manner (e.g., in a Gantt chart format).

For example, in one embodiment, the user interface logic 120 is configured to facilitate receiving inputs and reading data in response to user actions. For example, the user interface logic 120 may facilitate selection, reading, and inputting of an electronic file for a project plan. A project plan may reside in at least one data structure (e.g., within database device 160) associated with (and accessible by) a project management application (e.g., the project management logic 110) via the graphical user interface.

Furthermore, the user interface logic 120 is configured to facilitate the outputting and displaying of a computerized project plan via the graphical user interface on the display screen 150. Task structures and their dependent relationships to each other may be output and displayed as part of the computerized project plan (e.g., as a Gantt chart).

In one embodiment, task generation logic 140 is configured to generate a task data structure within a computerized project plan in response to user interaction with a graphical user interface. The task data structure represents a task of a project. In accordance with one embodiment, a task data structure is a data structure having data that define various attributes of an associated task. Attributes may include, for example, a start date associated with the task, a finish date associated with the task, and various other attributes representing, for example, progress made with respect to the task.

Various task data structures may be generated and displayed in a Gantt chart format, in accordance with one embodiment. Thus a task data structure in a project plan is used to record and track the status of a respective task. Data representing the status of the task may be received from external devices that are configured to report such data and/or the data may be inputted into the present system by a user.

In one embodiment, relational model logic 130 is configured to establish a tradeoff relationship between a time variable and a quality variable associated with a task data structure within a computerized project plan. The established tradeoff relationship allows a user to manipulate the task data structure to tradeoff a quality level of a result of the task with a time duration to complete the task.

In one embodiment, relational model logic 130 is configured to establish a tradeoff relationship for a task data structure of a task as follows. A first data point coordinate is established within a data field of the task data structure by pairing a first time value representing an estimated time duration in which to complete the task with a first quality value representing a maximum quality level for the result of the task. A second data point coordinate is also established within a data field of the task data structure by pairing a second time value representing another estimated time duration in which to complete the task with a second quality value representing a minimum quality level for the result of the task. A relational model is then applied between the first data point and the second data point within data fields of the task data structure. The relational model relates the time variable to the quality variable. Based on the relational model, a quality level of the result decreases as the time duration to complete the task decreases from the first data point to the second data point.

In one embodiment, the relational model is deterministic and single interation. That is, inputting a value (e.g., 3 days) for a particular time duration to complete the task yields a determined value (e.g., 80%) representing the quality level of a result of the task for that time duration, without having to perform any iterations to arrive at the quality level value. Similarly, inputting a value (e.g., 80%) for a particular quality level of a result of the task yields a determined value (e.g., 3 days) representing the time duration to complete the task at that quality level, without having to perform any iterations to arrive at the time duration value.

In one embodiment, the relational model is non-linear. For example, the relational model may be exponential, quadratic, or cubic (e.g., see FIG. 3). In one embodiment, the relational model predicts a reduction in the quality level of the result of the task by 50% more than what would have been predicted by a linear model, at a time duration which is midway between the first data point and the second data point. Such a 50% model (50% more pessimistic than linear model at midway time point) is considered to be pessimistic enough to be useful for making accurate predictions for real-world tradeoffs between quality and time.

In accordance with one embodiment, relational model logic 130 provides multiple relational models that are configured to relate the time variable to the quality variable associated with a task data structure. Furthermore, a relational model is selectable from the multiple relational models by a user via the graphical user interface when establishing the tradeoff relationship. Again, some example relational models are discussed later herein with respect to FIG. 3.

In this manner, tradeoff relationships can be established for tasks without having to gather or process a large number of data points. A user can make tradeoffs between quality and time to, for example, rush a task to completion while sacrificing a certain amount of quality.

Figure 2:
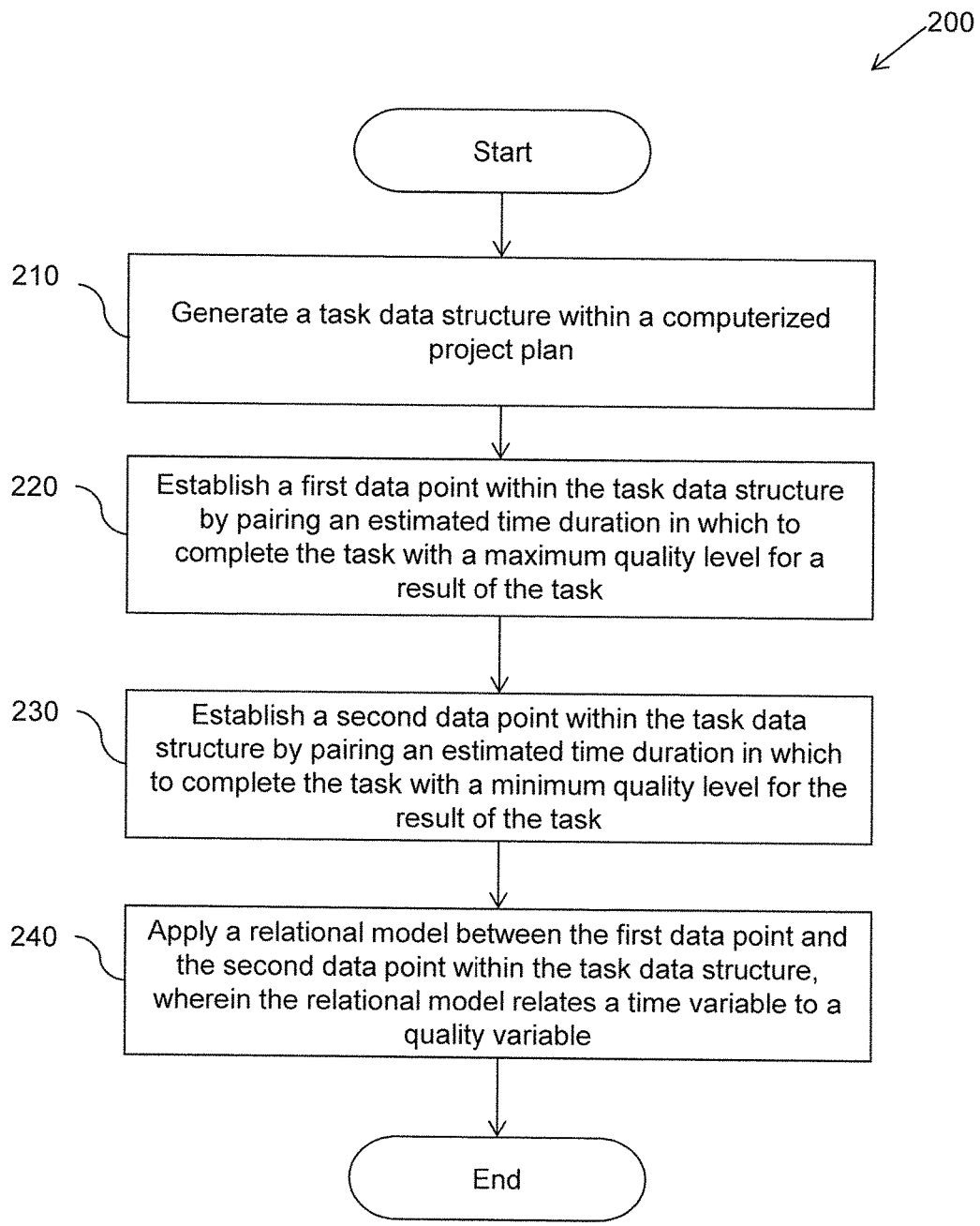
FIG. 2 illustrates one embodiment of a method, which can be performed by the project management logic of the computer system of FIG. 1, to establish a tradeoff relationship between a time variable and a quality variable associated with a task.

FIG. 2 illustrates one embodiment of a method 200, which can be performed by the project management logic 110 of the computer system 100 of FIG. 1, to establish a tradeoff relationship between a time variable and a quality variable associated with a task. Method 200 may be implemented by a computing device configured with algorithms that perform the method 200. For example, in one embodiment, method 200 is implemented by a computing device configured to execute a computer application. The computer application is configured to process data in electronic form and includes stored executable instructions that perform the functions of the method 200.

The method 200 will be described from the perspective that a computerized project plan is made up of representations of tasks (e.g., task data structures) that can be associated with each other to form dependent relationships. In one embodiment, the project management logic 110 is configured to establish a tradeoff relationship between a time variable and a quality variable associated with a task data structure representing a task of a project within a computerized project plan.

Upon initiating method 200, at block 210, a task data structure is generated within a computerized project plan, in response to user interaction with a graphical user interface, having a time variable and a quality variable. The task data structure represents a task of a project plan. In one embodiment, a task bar may be displayed on the display screen 150 as part of a Gantt chart to visually represent the task to the user. The task data structure is generated by the task generation logic 140, in accordance with one embodiment.

At block 220, a first data point is established within the task data structure. A first time value corresponding to an estimated time duration in which to complete the task is paired with a first quality value corresponding to a maximum quality level for a result of the task to form the first data point. At block 230, a second data point is established within the task data structure. A second time value corresponding to an estimated time duration in which to complete the task is paired with a second quality value corresponding to a minimum quality level for the result of the task to form the second data point. The first and second data points form two end points for a range over which quality and time may be traded off. The first and second data points are established within the task data structure by relational model logic 130, in accordance with one embodiment.

At block 240, a relational model is applied between the endpoints (i.e., between the first data point and the second data point) within the task data structure. The relational model relates the time variable to the quality variable over the range over which quality and time may be traded off. The relational model allows a user to, via the graphical user interface, manipulate the task data structure to tradeoff a quality of a result of the task with a time duration to complete the task. In one embodiment, the relational model may be selected, in response to user interaction with the graphical user interface, before applying the relational model between the first data point and the second data point within the task data structure. Multiple choices of relational models may be provided, in accordance with one embodiment. The relational model is applied between the data points within the task data structure by relational model logic 130, in accordance with one embodiment.

Once a tradeoff relationship is established for a particular task, a time duration in which to complete the task may be transformed, in accordance with the tradeoff relationship, by changing a quality level for the result of the task via user interaction with the graphical user interface. Similarly, once a tradeoff relationship is established for a particular task, a quality level for the result of the task may be transformed, in accordance with the tradeoff relationship, by changing a time duration in which to complete the task via user interaction with the graphical user interface.

For example, in one embodiment, a user may use the graphical user interface to move a displayed quality level icon relative to a quality dimension or scale of a displayed task bar representing a task. A change in position of the quality level icon with respect to the quality dimension represents a change in the quality level of the result of the task. As the quality level icon is moved, a displayed time duration icon is automatically moved relative to a time dimension or scale of the displayed task bar based on the established tradeoff relationship for the task. A change in position of the time duration icon with respect to the time dimension represents a change in the time duration to complete the task.

Similarly, in one embodiment, a user may use the graphical user interface to move the displayed time duration icon relative to the time dimension or scale of the displayed task bar. A change in position of the time duration icon with respect to the time dimension represents a change in the time duration to complete the task. As the time duration icon is moved, a displayed quality level icon is automatically moved relative to a quality dimension or scale of the displayed task bar based on the established tradeoff relationship for the task. A change in position of the quality level icon with respect to the quality dimension represents a change in the quality level of the result of the task.

For example, a whole production batch of woodcraft items may be ready for delivery, except for only a few of the items, which cannot be missing from the batch. However, it has become apparent that taking the full originally scheduled time to complete the remaining items means delay, risking that the whole batch may get forfeited. Surely, it is desirable to rush the remaining items, maybe at the expense of those remaining items being at lower than optimal quality.

As another example, a pre-fabricated steel pillar used in the construction of a building is to be machine-polished and hand-painted before it can be used. Both the machine-polishing and the hand-painting take time. However, the pillar is holding up construction work of an entire floor of the building. Surely, it is desirable to rush the completion of the pillar, maybe at the expense of the quality of the polishing and painting.

As a further example, while doing decoration for an event, it is discovered that the flowers arrived late. However, by the time the flower decoration can be properly accomplished, guests would already be arriving. Surely, it is desirable to compromise on flower decoration quality in order to finish before the guests start arriving.

As a final example, while developing a software product, a complex algorithm piece may take a long time to develop if the algorithm has to be highly optimized for performance. However, if the timelines are very tight, the task may have to be completed with less than an optimally performant algorithm.

In this manner, for such examples, using the systems and methods described herein, quality and time can be traded off such that certain tasks may be rushed by sacrificing quality, but not by sacrificing an unacceptable amount of quality. As a result, a project manager can determine ahead of time, in a pessimistic sense, how much quality will be sacrificed by rushing a task by a certain amount. The project manager can then decide if the sacrifice in quality is worth rushing the task by that amount. Furthermore, the tradeoff relationship is established with only two (2) data end points and a relational model applied between the two (2) data end points.

Figure 3:
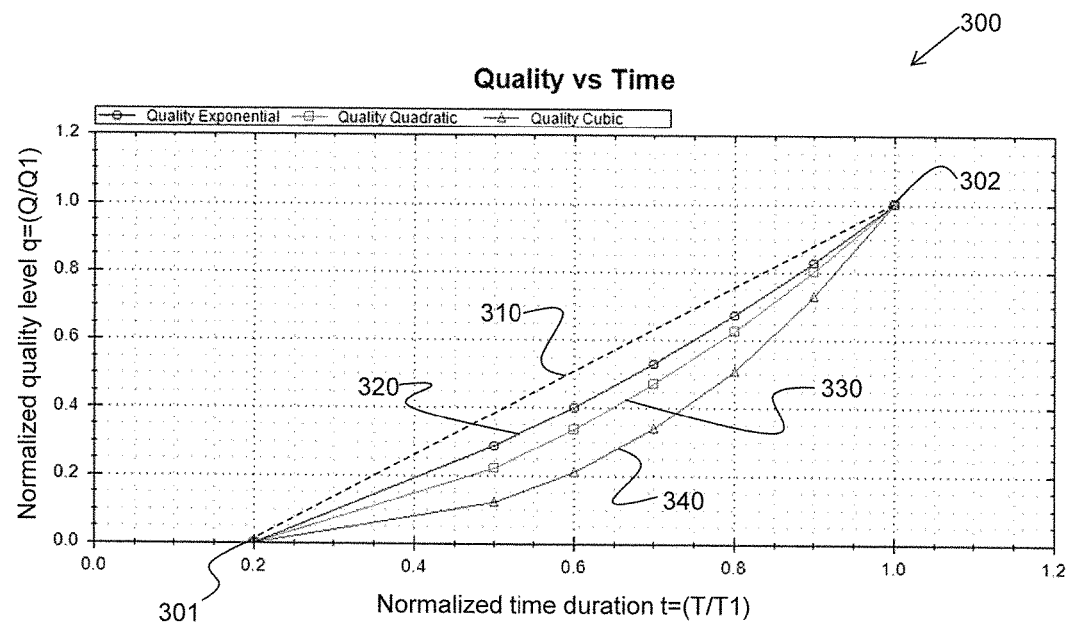
FIG. 3 illustrates a graph showing three possible different tradeoff relationships between quality and time for a task that can be established using the method of FIG. 2 on the computer system of FIG. 1.
Figure 7:
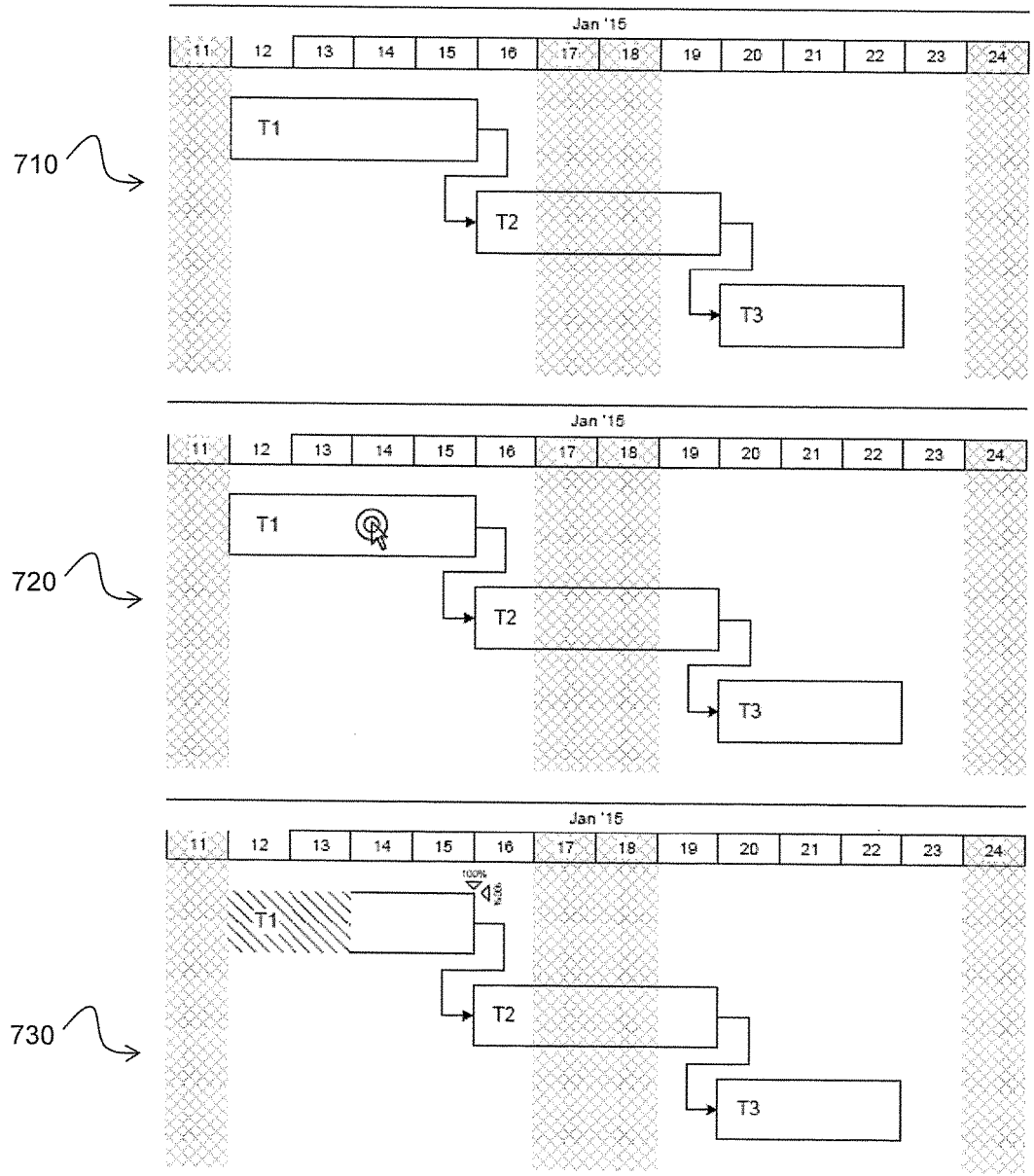
FIGS. 7-10 illustrate example diagrams showing a portion of a Gantt chart within a computerized project plan as it is manipulated using the computer system of FIG. 1 to make tradeoffs between quality and time for tasks of a project.

FIG. 3 illustrates a graph 300 showing three possible different tradeoff relationships, relative to a linear relationship, between quality and time for a task that can be established using the method 200 of FIG. 2 on the computer system 100 of FIG. 1. The vertical axis of the graph 300 represents a normalized quality level "$Q/Q_1$" of a result of a task, normalized to a value "$Q_1$" representing a maximum possible quality level of a result of the task (e.g., one (1) or 100%). The horizontal axis of the graph 300 represents a normalized time duration "$T/T_1$" in which to complete a task, normalized to a value representing a possible time duration "$T_1$" allowed in which to complete a task (e.g., one (1) or 100%), which would achieve Q1 quality. Furthermore, an estimated time duration allowed in which to complete the task with minimum quality is also defined as $T_0$. In the graph of FIG. 3, the minimum quality level is assumed to be zero (0).

A value $k=T_0/T_1$ is a rational representation of a distance between the minimum time duration $T_0$ and the maximum time duration $T_1$. The smaller $T_0$ is with respect to $T_1$, the larger is the overall span of time duration between a first data point and a second data point defining the end points over which quality level and time duration can be traded off. The first data point in FIG. 3 is point 301 corresponding to an estimated time duration (T0) for a minimum quality level point of $(T/T_1, Q/Q_1)=(0.2, 0)$. Similarly, the second data point in FIG. 3 is point 302 corresponding to an estimated time duration (T1) for a maximum quality level point of $(T/T_1, Q/Q_1)=(1.0, 1.0)$.

The linear relationship 310 of FIG. 3 is not a practical representation of a relationship between time and quality. In nearly no practical real-world cases does the quality of a result of a task fall off linearly with the time duration to complete the task. Instead, quality level tends to fall off faster than time duration, suggesting a non-linear relationship between quality and time.

The non-linear relationship 320 is an exponential tradeoff relationship and is more pessimistic (and realistic) than the linear relationship 310. FIG. 4 illustrates a first table 400 of data and formulas used to form the exponential tradeoff relationship 320 shown in FIG. 3. As shown in table 400, normalized time duration $t=(T/T_1)$ can be varied (e.g., from 0.5 to 0.9) to see how normalized quality level $q=(Q/Q_1)$ would vary. Similarly, normalized quality level $q=(Q/Q_1)$ can be varied (e.g., from 0.5 to 0.9) to see how normalized time duration $t=(T/T_1)$ would vary. In FIG. 4, tradeoffs between normalized quality level and normalized time duration are shown for values of $T_0/T_1$ of 0.2, 0.3, and 0.4.

It can be seen from FIG. 3 that the exponential tradeoff relationship 320 is more pessimistic than the linear tradeoff relationship 310. That is, for the exponential tradeoff relationship 320, quality level falls off faster than time duration than it does for the linear tradeoff relationship 310. The exponential tradeoff relationship 320 shown in FIG. 3 corresponds to a value of $T_0/T_1=0.2$.

The non-linear relationship 330 is a quadratic relationship and is more pessimistic than the linear relationship 310 and the exponential relationship 320. FIG. 5 illustrates a second table 500 of data and formulas used to form the quadratic tradeoff relationship 330 shown in FIG. 3. As shown in table 500, normalized time duration $t=(T/T_1)$ can be varied (e.g., from 0.5 to 0.9) to see how normalized quality level $q=(Q/Q_1)$ would vary. Similarly, normalized quality level $q=(Q/$ $Q_1$) can be varied (e.g., from 0.5 to 0.9) to see how normalized time duration $t=(T/T_1)$ would vary. In FIG. 5, tradeoffs between normalized quality level and normalized time duration are shown for values of $T_0/T_1$ of 0.2, 0.3, and 0.4.

It can be seen from FIG. 3 that the quadratic tradeoff relationship 330 is more pessimistic than the linear tradeoff relationship 310 and the exponential tradeoff relationship 320. That is, for the quadratic tradeoff relationship 330, quality level falls off faster than time duration than it does for the linear tradeoff relationship 310 and the exponential tradeoff relationship 320. The quadratic tradeoff relationship 330 shown in FIG. 3 corresponds to a value of $T_0/T_1=0.2$.

The non-linear relationship 340 is a cubic relationship and is more pessimistic than the linear relationship 310, the exponential relationship 320, and the quadratic relationship 330. FIG. 6 illustrates a third table 600 of data and formulas used to form the cubic tradeoff relationship 340 shown in FIG. 3. As shown in table 600, normalized time duration $t=(T/T_1)$ can be varied (e.g., from 0.5 to 0.9) to see how normalized quality level $q=(Q/Q_1)$ would vary. Similarly, normalized quality level $q=(Q/Q_1)$ can be varied (e.g., from 0.5 to 0.9) to see how normalized time duration $t=(T/T_1)$ would vary. In FIG. 6, tradeoffs between normalized quality level and normalized time duration are shown for values of $T_0/T_1$ of 0.2, 0.3, and 0.4.

It can be seen from FIG. 3 that the cubic tradeoff relationship 340 is more pessimistic than the linear tradeoff relationship 310, the exponential tradeoff relationship 320, and the quadratic tradeoff relationship 330. That is, for the cubic tradeoff relationship 340, quality level falls off faster than time duration than it does for the linear tradeoff relationship 310, the exponential tradeoff relationship 320, and the quadratic tradeoff relationship 330. The cubic tradeoff relationship 340 shown in FIG. 3 corresponds to a value of $T_0/T_1=0.2$. In accordance with one embodiment, a particular tradeoff relationship may be selected based on what is considered to be appropriate for a particular type of task and/or industry.

FIGS. 7-10 illustrate example diagrams showing a portion of a Gantt chart within a computerized project plan as it is manipulated using the computer system 100 of FIG. 1 to make tradeoffs between quality and time for tasks of a project. Referring to chart 710, tasks T1, T2, and T3 are shown as part of a project plan forming a chain with finish-to-start dependencies between them. The original time duration estimates for the tasks T1, T2, and T3 are four (4) days, two (2) days, and three (3) days, respectively. All of the tasks are expected to finish by the end-of-day twenty-two (22).

Referring to chart 720, a user (e.g., a project planning manager) selects task T1 (e.g., by double clicking on the T1 task bar). The user marks the maximum rushability for task T1 as being two (2) days. The maximum rushability is the same as the estimated time duration needed, $T_0$, in which to complete the task, with minimum quality level. Referring to chart 730, the system shows the rushability factor, visually, by a line-shaded region within the task bar rectangle for task T1. Two (2) slider icons are also shown at the top right corner of the task bar rectangle. The line-shaded region indicates the time (or effort) which must be spent to complete the task, ignoring the quality aspect completely (i.e., zero or minimum possible quality). The horizontal and vertical slider icons show estimated time taken with rush (as a % of original time), and minimum expected quality level within rush (as a % of total quality), respectively. Since no rush has been set, both icons shown 100% in chart 730.

Figure 8:
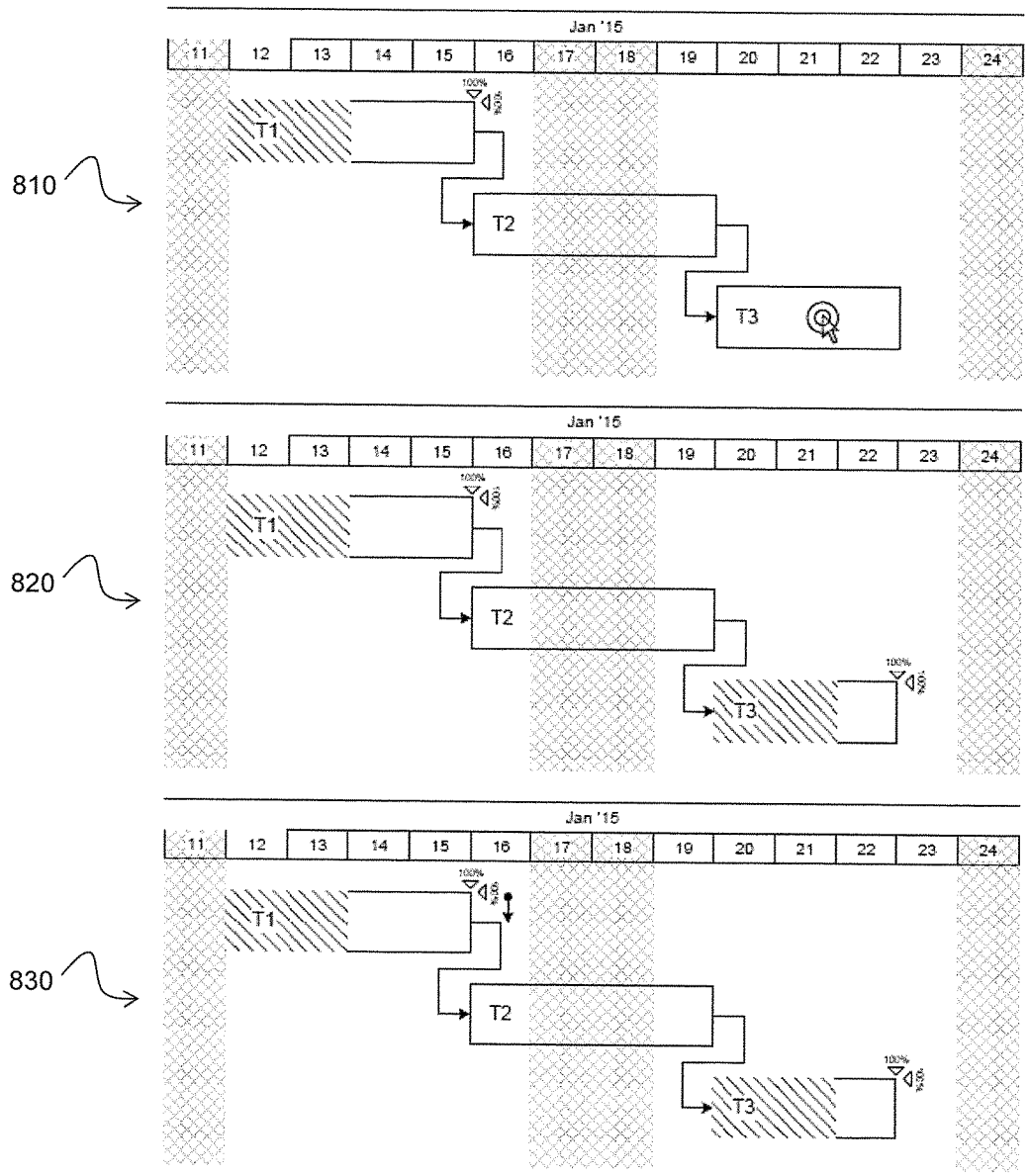
Figure 9:
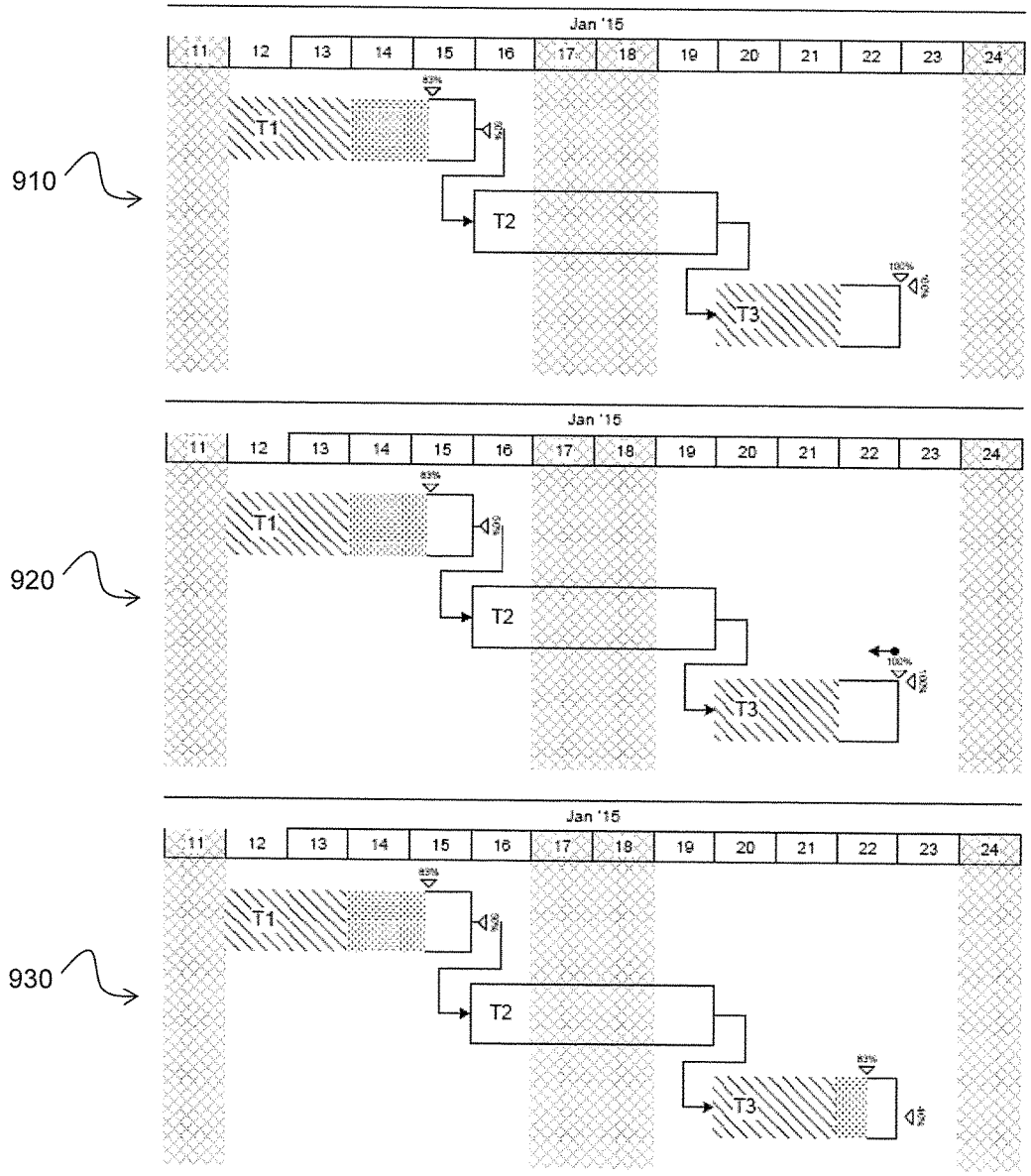

Referring to chart 810 of FIG. 8, the user selects task T3 and the user marks the maximum rushability for task T3 as two (2) days. Referring to chart 820, the system shows the rushability factor, visually, by a line-shaded region within the task bar rectangle for task T3. Two (2) slider icons are also shown at the top right corner of the task rectangle (a time duration icon and a quality level icon). Both of the icons show 100% since no rush as been set yet. The edge of the task bar/rectangle, which is perpendicular to the time axis, represents the quality axis for the quality slider icon on the graphical user interface.

Referring to chart 830, the user drags the quality vertical slider for task T1 downward to the 50% mark. The system calculates (e.g., using the cubic tradeoff relationship) that a minimum time to be taken is 83% of the original time, even if the task T1 is rushed and the minimum quality expectation for the result of task T1 is relaxed to 50%. Referring to chart 910 of FIG. 9, the 83% time duration point and the 50% quality level point are shown on the task bar for task T1, along with a dotted shaded inner bar within the T3 task bar to the 83% level.

Referring to chart 920, the user drags the rushed time horizontal slider icon for task T3 to the left to the 83% time duration point. Referring to chart 930, the system calculates (e.g., using the cubic tradeoff relationship) that the minimum quality level that can be expected for the result of task T3 is 40% if the task is rushed to complete within 83% of the original estimated time duration. The system shows this by repositioning the vertical slider icon to the 40% level and by also showing a dotted shaded inner bar within the T3 task bar to the 83% level.

Figure 10:
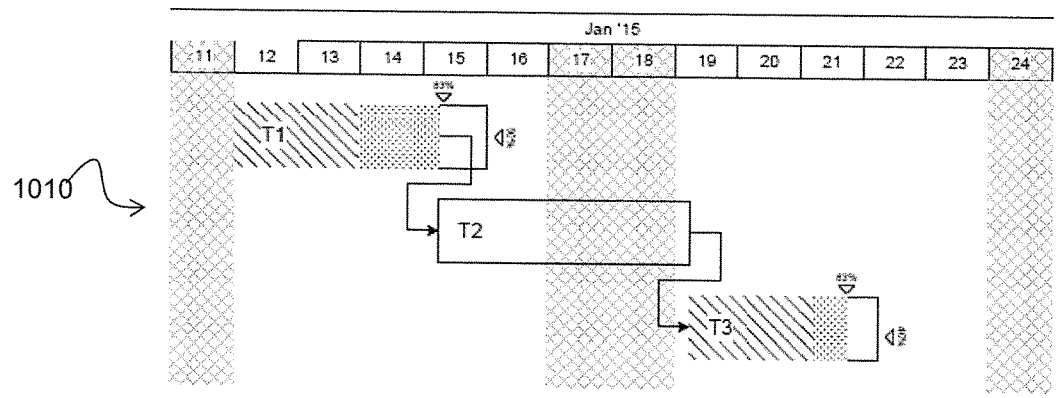

Referring to chart 1010 of FIG. 10, the user performs a scheduling operation on the project plan with the rush turned on. The system moves T2 and T3 back in time as far as allowed by the rushed timelines and indicates to the user that all three task can now be completed a little ahead of time (i.e., by end-of-day twenty-one (21)).

In accordance with one embodiment, specifying the rushability numbers (quality and time) can be performed one-by-one, as shown in FIGS. 7-10. Alternatively, the rushability numbers (quality and time) can be specified in a bulk manner (i.e., entered into the system all at the same time). To perform scheduling with rush "on", the system has to consider the rushed time duration values, instead of the original time duration values.

In this manner, a user can interact with a user interface of a project management system to tradeoff time duration and quality level for tasks of a project to possibly shorten the overall time of a project. Quality level icons and time duration icons can be manipulated with respect to dimensions of a task bar of a task to make a tradeoff in accordance with an established tradeoff relationship (e.g., a cubic tradeoff relationship).

Systems, methods, and other embodiments have been described that are configured to allow tradeoffs to be made between time and quality for tasks of a project in a computerized project plan. In one embodiment, a user interface module, including instructions stored in a non-transitory computer-readable medium, is configured to provide a graphical user interface associated with a computerized project plan. A task generation module, including instructions stored in the non-transitory computer-readable medium, is configured to generate a task data structure within the computerized project plan in response to user interaction with the graphical user interface. The task data structure represents a task of the project. A relational model module, including instructions stored in a non-transitory computer-readable medium, is configured to establish a tradeoff relationship between a time variable and a quality variable associated with the task data structure within the computerized project plan. The tradeoff relationship allows a user to manipulate the task data structure, in response to user interaction with the graphical user interface, to tradeoff a quality level of a result of the task with a time duration to complete the task.

Computing Device Embodiment

Figure 11:
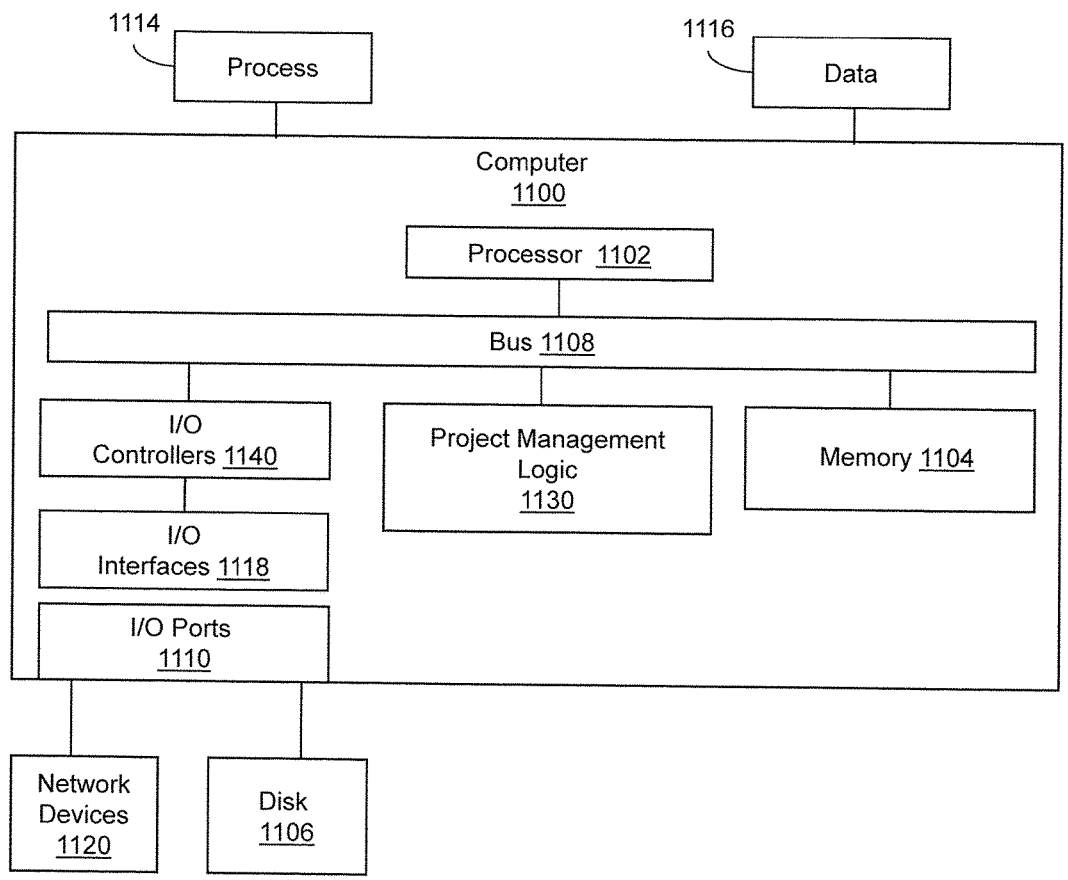
FIG. 11 illustrates one embodiment of a computing device upon which a project management logic of a computing system may be implemented.

FIG. 11 illustrates an example computing device that is configured and/or programmed with one or more of the example systems and methods described herein, and/or equivalents. FIG. 11 illustrates one example embodiment of a computing device upon which an embodiment of a project management logic may be implemented. The example computing device may be a computer 1100 that includes a processor 1102, a memory 1104, and input/output ports 1110 operably connected by a bus 1108.

In one example, the computer 1100 may include project management logic 1130 (corresponding to project management logic 110 from FIG. 1) configured with a programmed algorithm as disclosed herein to allow tradeoffs to be made between time and quality for tasks of a project in a computerized project plan. In different examples, the logic 1130 may be implemented in hardware, a non-transitory computer-readable medium with stored instructions, firmware, and/or combinations thereof. While the logic 1130 is illustrated as a hardware component attached to the bus 1108, it is to be appreciated that in other embodiments, the logic 1130 could be implemented in the processor 1102, a module stored in memory 1104, or a module stored in disk 1106.

In one embodiment, logic 1130 or the computer 1100 is a means (e.g., structure: hardware, non-transitory computer-readable medium, firmware) for performing the actions described. In some embodiments, the computing device may be a server operating in a cloud computing system, a server configured in a Software as a Service (SaaS) architecture, a smart phone, laptop, tablet computing device, and so on.

The means may be implemented, for example, as an ASIC programmed to allow tradeoffs to be made between time and quality for tasks of a project in a computerized project plan. The means may also be implemented as stored computer executable instructions that are presented to computer 1100 as data 1116 that are temporarily stored in memory 1104 and then executed by processor 1102.

Logic 1130 may also provide means (e.g., hardware, non-transitory computer-readable medium that stores executable instructions, firmware) to allow tradeoffs to be made between time and quality for tasks of a project in a computerized project plan.

Generally describing an example configuration of the computer 1100, the processor 1102 may be a variety of various processors including dual microprocessor and other multi-processor architectures. A memory 1104 may include volatile memory and/or non-volatile memory. Non-volatile memory may include, for example, ROM, PROM, and so on. Volatile memory may include, for example, RAM, SRAM, DRAM, and so on.

A storage disk 1106 may be operably connected to the computer 1100 via, for example, an input/output interface (e.g., card, device) 1118 and an input/output port 1110. The disk 1106 may be, for example, a magnetic disk drive, a solid state disk drive, a floppy disk drive, a tape drive, a Zip drive, a flash memory card, a memory stick, and so on. Furthermore, the disk 1106 may be a CD-ROM drive, a CD-R drive, a CD-RW drive, a DVD ROM, and so on. The memory 1104 can store a process 1114 and/or a data 1116, for example. The disk 1106 and/or the memory 1104 can store an operating system that controls and allocates resources of the computer 1100.

The computer 1100 may interact with input/output devices via the i/o interfaces 1118 and the input/output ports 1110. Input/output devices may be, for example, a keyboard, a microphone, a pointing and selection device, cameras, video cards, displays, the disk 1106, the network devices 1120, and so on. The input/output ports 1110 may include, for example, serial ports, parallel ports, and USB ports.

The computer 1100 can operate in a network environment and thus may be connected to the network devices 1120 via the i/o interfaces 1118, and/or the i/o ports 1110. Through the network devices 1120, the computer 1100 may interact with a network. Through the network, the computer 1100 may be logically connected to remote computers. Networks with which the computer 1100 may interact include, but are not limited to, a LAN, a WAN, and other networks.

Definitions and Other Embodiments

In another embodiment, the described methods and/or their equivalents may be implemented with computer executable instructions. Thus, in one embodiment, a non-transitory computer readable/storage medium is configured with stored computer executable instructions of an algorithm/executable application that when executed by a machine(s) cause the machine(s) (and/or associated components) to perform the method. Example machines include but are not limited to a processor, a computer, a server operating in a cloud computing system, a server configured in a Software as a Service (SaaS) architecture, a smart phone, and so on). In one embodiment, a computing device is implemented with one or more executable algorithms that are configured to perform any of the disclosed methods.

In one or more embodiments, the disclosed methods or their equivalents are performed by either: computer hardware configured to perform the method; or computer software embodied in a non-transitory computer-readable medium including an executable algorithm configured to perform the method.

While for purposes of simplicity of explanation, the illustrated methodologies in the figures are shown and described as a series of blocks of an algorithm, it is to be appreciated that the methodologies are not limited by the order of the blocks. Some blocks can occur in different orders and/or concurrently with other blocks from that shown and described. Moreover, less than all the illustrated blocks may be used to implement an example methodology. Blocks may be combined or separated into multiple actions/components. Furthermore, additional and/or alternative methodologies can employ additional actions that are not illustrated in blocks. The methods described herein are limited to statutory subject matter under 35 U.S.C §101.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

ASIC: application specific integrated circuit.
CD: compact disk.
CD-R: CD recordable.
CD-RW: CD rewriteable.
DVD: digital versatile disk and/or digital video disk.
LAN: local area network.
RAM: random access memory.
DRAM: dynamic RAM.
SRAM: synchronous RAM.
ROM: read only memory.
PROM: programmable ROM.
USB: universal serial bus.
WAN: wide area network.

An "operable connection", or a connection by which entities are "operably connected", is one in which signals, physical communications, and/or logical communications may be sent and/or received. An operable connection may include a physical interface, an electrical interface, and/or a data interface. An operable connection may include differing combinations of interfaces and/or connections sufficient to allow operable control. For example, two entities can be operably connected to communicate signals to each other directly or through one or more intermediate entities (e.g., processor, operating system, logic, non-transitory computer-readable medium). An operable connection may include one entity generating data and storing the data in a memory, and another entity retrieving that data from the memory via, for example, instruction control. Logical and/or physical communication channels can be used to create an operable connection.

A "data structure", as used herein, is an organization of data in a computing system that is stored in a memory, a storage device, or other computerized system. A data structure may be any one of, for example, a data field, a data file, a data array, a data record, a database, a data table, a graph, a tree, a linked list, and so on. A data structure may be formed from and contain many other data structures (e.g., a database includes many data records). Other examples of data structures are possible as well, in accordance with other embodiments.

"Computer-readable medium" or "computer storage medium", as used herein, refers to a non-transitory medium that stores instructions and/or data configured to perform one or more of the disclosed functions when executed. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, an application specific integrated circuit (ASIC), a programmable logic device, a compact disk (CD), other optical medium, a random access memory (RAM), a read only memory (ROM), a memory chip or card, a memory stick, solid state storage device (SSD), flash drive, and other media from which a computer, a processor or other electronic device can function with. Each type of media, if selected for implementation in one embodiment, may include stored instructions of an algorithm configured to perform one or more of the disclosed and/or claimed functions. Computer-readable media described herein are limited to statutory subject matter under 35 U.S.C §101.

"Logic", as used herein, represents a component that is implemented with computer or electrical hardware, a non-transitory medium with stored instructions of an executable application or program module, and/or combinations of these to perform any of the functions or actions as disclosed herein, and/or to cause a function or action from another logic, method, and/or system to be performed as disclosed herein. Equivalent logic may include firmware, a microprocessor programmed with an algorithm, a discrete logic (e.g., ASIC), at least one circuit, an analog circuit, a digital circuit, a programmed logic device, a memory device containing instructions of an algorithm, and so on, any of which may be configured to perform one or more of the disclosed functions. In one embodiment, logic may include one or more gates, combinations of gates, or other circuit components configured to perform one or more of the disclosed functions. Where multiple logics are described, it may be possible to incorporate the multiple logics into one logic. Similarly, where a single logic is described, it may be possible to distribute that single logic between multiple logics. In one embodiment, one or more of these logics are corresponding structure associated with performing the disclosed and/or claimed functions. Choice of which type of logic to implement may be based on desired system conditions or specifications. For example, if greater speed is a consideration, then hardware would be selected to implement functions. If a lower cost is a consideration, then stored instructions/executable application would be selected to implement the functions. Logic is limited to statutory subject matter under 35 U.S.C. §101.

"User", as used herein, includes but is not limited to one or more persons, computers or other devices, or combinations of these.

While the disclosed embodiments have been illustrated and described in considerable detail, it is not the intention to restrict or in any way limit the scope of the appended claims to such detail. It is, of course, not possible to describe every conceivable combination of components or methodologies for purposes of describing the various aspects of the subject matter. Therefore, the disclosure is not limited to the specific details or the illustrative examples shown and described. Thus, this disclosure is intended to embrace alterations, modifications, and variations that fall within the scope of the appended claims, which satisfy the statutory subject matter requirements of 35 U.S.C. §101.

To the extent that the term "includes" or "including" is employed in the detailed description or the claims, it is intended to be inclusive in a manner similar to the term "comprising" as that term is interpreted when employed as a transitional word in a claim.

To the extent that the term "or" is used in the detailed description or claims (e.g., A or B) it is intended to mean "A or B or both". When the applicants intend to indicate "only A or B but not both" then the phrase "only A or B but not both" will be used. Thus, use of the term "or" herein is the inclusive, and not the exclusive use.

To the extent that the phrase "one or more of, A, B, and C" is used herein, (e.g., a data store configured to store one or more of, A, B, and C) it is intended to convey the set of possibilities A, B, C, AB, AC, BC, and/or ABC (e.g., the data store may store only A, only B, only C, A&B, A&C, B&C, and/or A&B&C). It is not intended to require one of A, one of B, and one of C. When the applicants intend to indicate "at least one of A, at least one of B, and at least one of C", then the phrasing "at least one of A, at least one of B, and at least one of C" will be used.

What is claimed is:

1. A computer-implemented method comprising:
in response to user interaction with a graphical user interface associated with a computerized project plan, establishing a tradeoff relationship between a time variable and a quality variable, associated with a task data structure representing a task of a project within the computerized project plan, by:
  (i) establishing a first data point within the task data structure by pairing a first time value corresponding to a first estimated time duration in which to complete the task with a first quality value corresponding to a maximum quality level for a result of the task;
  (ii) establishing a second data point within the task data structure by pairing a second time value corresponding to a second estimated time duration in which to complete the task with a second quality value corresponding to a minimum quality level for the result of the task;
  (iii) applying a relational model between the first data point and the second data point within the task data structure, wherein the relational model relates the time variable to the quality variable to define a dependency of a tradeoff between a quality of a result of the task with a time duration to complete the task;
  (iv) generating, on a display screen, a visual representation of the dependency between the tradeoff of the quality of the result to the time duration to allow an effect of the tradeoff to be viewed; and
  (v) generating at least one slider icon on the graphical user interface where the at least one slider icon is configured to allow a user to manipulate the time variable or the quality variable to change the dependency and causes the visual representation to be redisplayed with a recalculated tradeoff to view the effect of the recalculated tradeoff.

2. The method of claim 1, further comprising, in response to user interaction with the graphical user interface, generating the task data structure within the computerized project plan having the time variable and the quality variable.

3. The method of claim 1, further comprising, in response to user interaction with the graphical user interface, selecting the relational model before applying the relational model between the first data point and the second data point within the task data structure.

4. The method of claim 1, further comprising, in response to user interaction with the graphical user interface, transforming a time duration in which to complete the task by changing a quality level for the result, in accordance with the tradeoff relationship.

5. The method of claim 1, further comprising, in response to user interaction with the graphical user interface, transforming a quality level for the result by changing a time duration in which to complete the task, in accordance with the tradeoff relationship.

6. The method of claim 1,
  wherein the at least one slider icon is generated to include a displayed quality level icon and a displayed time duration icon;
  wherein the method further comprising:
  in response to user interaction with the graphical user interface, moving the displayed quality level icon relative to a quality dimension of a displayed task bar associated with the task, wherein a change in position of the quality level icon with respect to the quality dimension represents a change in the quality level of the result; and
  as the quality level icon is moved, automatically moving a displayed time duration icon relative to a time dimension of the displayed task bar based on the tradeoff relationship, wherein a change in position of the time duration icon with respect to the time dimension represents a change in the time duration to complete the task, and wherein an edge of the task bar is perpendicular to the time dimension and represents the quality dimension for the quality level icon on the graphical user interface.

7. The method of claim 1,
  wherein the at least one slider icon is generated to include a displayed time duration icon and a displayed quality level icon;
  wherein the method further comprising:
  in response to user interaction with the graphical user interface, moving the displayed time duration icon relative to a time dimension of a displayed task bar associated with the task, wherein a change in position of the time duration icon with respect to the time dimension represents a change in the time duration to complete the task; and
  as the time duration icon is moved, automatically moving a displayed quality level icon relative to a quality dimension of the displayed task bar based on the tradeoff relationship, wherein a change in position of the quality level icon with respect to the quality dimension represents a change in the quality level of the result.

8. The method of claim 1, wherein, based on the relational model, the quality level of the result decreases as the time duration to complete the task decreases from the first data point to the second data point.

9. The method of claim 1, wherein the relational model results in a reduction in the quality level of the result of at least 50% from a linear model, at a time duration midway between the first data point and the second data point.

10. The method of claim 1, wherein the relational model is non-linear, deterministic, and single iteration.

11. The method of claim 1, wherein the relational model can be one of an exponential model, a quadratic model, or a cubic model.

12. A computing system comprising:
  at least one memory;
  a processor operably connected to the at least one memory;
  a non-transitory computer-readable medium storing computer-executable instructions that when executed by the processor, cause the processor to:
    generate a graphical user interface on the display screen that displays portions of a computerized project plan that includes at least a time variable and a quality variable assigned to a task of a project as part of the computerized project plan;
    establishing a tradeoff relationship between the time variable and the quality variable which as stored in a task data structure representing the task of the project, wherein the establishing includes:
    (i) establishing a first data point within the task data structure by pairing a first time value corresponding to a first estimated time duration in which to complete the task with a first quality value corresponding to a maximum quality level for a result of the task;
    (ii) establishing a second data point within the task data structure by pairing a second time value corresponding to a second estimated time duration in which to complete the task with a second quality value corresponding to a minimum quality level for the result of the task;
    (iii) applying a relational model between the first data point and the second data point within the task data structure, wherein the relational model relates the time variable to the quality variable to allow a user to, via the graphical user interface, manipulate the task data structure to tradeoff a quality of a result of the task with a time duration to complete the task;
(iv) generating, on a display screen, a visual representation of a dependency between the tradeoff of the quality of the result to the time duration to allow an effect of the tradeoff to be viewed; and
(v) generating at least one slider icon on the Graphical user interface where the at least one slider icon is configured to allow a user to manipulate the time variable or the quality variable to change the dependency and causes the visual representation to be redisplayed with a recalculated tradeoff to view the effect of the recalculated tradeoff.

13. The computing system of claim 12, wherein the instructions further comprise instructions that when executed by the processor cause the process to: provide multiple relational models that are selectable via the graphical user interface before applying the relational model between the first data point and the second data point within the task data structure.

14. The computing system of claim 12, wherein the instructions further comprise instructions that when executed by the processor cause the process to: transform a time duration in which to complete the task by changing a quality level for the result, in accordance with the tradeoff relationship.

15. The computing system of claim 12, wherein the instructions further comprise instructions that when executed by the processor cause the process to:
in response to user interaction with the graphical user interface, transform a quality level for the result by changing a time duration in which to complete the task, in accordance with the tradeoff relationship.

16. The computing system of claim 12,
wherein the at least one slider icon is generated to include a displayed quality level icon and a displayed time duration icon;
wherein the instructions further comprise instructions that when executed by the processor cause the process to:
in response to user interaction with the graphical user interface, move the displayed quality level icon relative to a quality dimension of a displayed task bar associated with the task, wherein a change in position of the quality level icon with respect to the quality dimension represents a change in the quality level of the result; and
as the quality level icon is moved, automatically move a displayed time duration icon relative to a time dimension of the displayed task bar based on the tradeoff relationship, wherein a change in position of the time duration icon with respect to the time dimension represents a change in the time duration to complete the task, and wherein an edge of the task bar is perpendicular to the time dimension and represents the quality dimension for the quality level icon on the graphical user interface.

17. The computing system of claim 12,
wherein the at least one slider icon is generated to include a displayed time duration icon and a displayed quality level icon;
wherein the instructions further comprise instructions that when executed by the processor cause the process to:
in response to user interaction with the graphical user interface, move the displayed time duration icon relative to a time dimension of a displayed task bar associated with the task, wherein a change in position of the time duration icon with respect to the time dimension represents a change in the time duration to complete the task; and
as the time duration icon is moved, automatically move a displayed quality level icon relative to a quality dimension of the displayed task bar based on the tradeoff relationship, wherein a change in position of the quality level icon with respect to the quality dimension represents a change in the quality level of the result.

18. The computing system of claim 12, wherein the relational model is an exponential model, a quadratic model, or a cubic model.

* * * * *

UNITED STATES PATENT AND TRADEMARK OFFICE
CERTIFICATE OF CORRECTION

PATENT NO. : 10,373,092 B2
APPLICATION NO. : 14/847581
DATED : August 6, 2019
INVENTOR(S) : De Page 1 of 1

It is certified that error appears in the above-identified patent and that said Letters Patent is hereby corrected as shown below:

In the Specification

In Column 10, Line 8, delete "as" and insert -- has --, therefor.

In the Claims

In Column 17, Line 10, in Claim 12, delete "Graphical" and insert -- graphical --, therefor.

Signed and Sealed this
Fourth Day of August, 2020

Andrei Iancu
*Director of the United States Patent and Trademark Office*